United States Patent
Gallé et al.

(10) Patent No.: US 9,189,473 B2
(45) Date of Patent: Nov. 17, 2015

(54) SYSTEM AND METHOD FOR RESOLVING ENTITY COREFERENCE

(75) Inventors: Matthias Gallé, St-Martin d'Heres (FR); Jean-Michel Renders, Quaix-en-Chartreuse (FR); Guillaume Jacquet, Biviers (FR)

(73) Assignee: XEROX Corporation, Norwalk, CT (US)

(*) Notice: Subject to any disclaimer, the term of this patent is extended or adjusted under 35 U.S.C. 154(b) by 630 days.

(21) Appl. No.: 13/475,250

(22) Filed: May 18, 2012

(65) Prior Publication Data
US 2013/0311467 A1    Nov. 21, 2013

(51) Int. Cl.
G06F 17/30    (2006.01)
G06F 17/27    (2006.01)

(52) U.S. Cl.
CPC .......... G06F 17/278 (2013.01); G06F 17/2795 (2013.01)

(58) Field of Classification Search
CPC ............ G06F 17/278; G06F 17/30705; G06F 17/2785; G06F 17/2795
USPC ....................................................... 707/737
See application file for complete search history.

(56) References Cited

U.S. PATENT DOCUMENTS

| | | | |
|---|---|---|---|
| 6,263,335 B1 | 7/2001 | Paik et al. | |
| 6,311,152 B1 | 10/2001 | Bai et al. | |
| 6,975,766 B2 | 12/2005 | Fukushima | |
| 7,058,567 B2 | 6/2006 | Ait-Mokhtar et al. | |
| 7,171,350 B2 | 1/2007 | Lin et al. | |
| 2003/0101187 A1 | 5/2003 | Gaussier et al. | |
| 2003/0182310 A1* | 9/2003 | Charnock et al. | 707/104.1 |
| 2005/0198056 A1* | 9/2005 | Dumais et al. | 707/101 |
| 2007/0143101 A1 | 6/2007 | Goutte | |
| 2007/0239745 A1 | 10/2007 | Guerraz et al. | |
| 2008/0027893 A1* | 1/2008 | Cavestro et al. | 707/1 |
| 2008/0249999 A1 | 10/2008 | Renders et al. | |
| 2008/0319978 A1 | 12/2008 | Brun et al. | |
| 2009/0204596 A1 | 8/2009 | Brun et al. | |
| 2010/0082331 A1 | 4/2010 | Brun et al. | |
| 2010/0191743 A1 | 7/2010 | Perronnin et al. | |
| 2010/0287160 A1* | 11/2010 | Pendar | 707/737 |
| 2011/0106807 A1* | 5/2011 | Srihari et al. | 707/739 |
| 2011/0137898 A1 | 6/2011 | Gordo et al. | |
| 2012/0030163 A1 | 2/2012 | Zhong | |

OTHER PUBLICATIONS

Ait-Mokhtar, et al. "Robustness beyond shallowness: incremental deep parsing", Nat. Lang. Jun. 2002, 8:121-144.

(Continued)

*Primary Examiner* — Thu-Nguyet Le
(74) *Attorney, Agent, or Firm* — Fay Sharpe LLP

(57) ABSTRACT

A method and a system for coreference resolution are provided. The method includes receiving a set of document clusters, each cluster in the set of document clusters including a set of text documents. Instances of each of a set of candidate named entities are identified in the document clusters. For a pairs of the candidate named entities, at least one socio-temporal feature is computed that is based on the similarity of the distributions of identified instances of the respective candidate name entities among the document clusters. A decision for merging for the candidate named entities into a common real named entity is based on the socio-temporal features.

25 Claims, 5 Drawing Sheets

(56) References Cited

OTHER PUBLICATIONS

Kotov, et al. "Mining named entities with temporally correlated bursts from multilingual web news streams", WSDM, ACM, 2011, pp. 237-246.

Luo, et al. "A mention-synchronous coreference resolution algorithm based on the bell tree", Proc. of the Annual Meeting on Association for Computational Linguistics, 2004, p. 1-8.

Ng, et al. "Improving machine learning approaches to coreference resolution", Proc. of the Annual Meeting on Association for Computational Linguistics, Jul. 2002, p. 104-111.

Nicolae, et al. "BestCut: A Graph Algorithm for Coreference Resolution", Proc. of Empirical Methods in Natural Language Processing, Jul. 2006, pp. 275-283.

U.S. Appl. No. 13/437,079, filed Apr. 2, 2012, Gallé et al.

Pedersen, et al. "Name discrimination by clustering similar contexts", Proc. of Conf. on Intelligent Test Processing and Computational Linguistics, 2004, pp. 226-237.

Pouliquen, et al. "Multilingual person name recognition and transliteration", CORELA 2006, 3(2): 115-123.

Shinyama, et al. "Named entity discovery using comparable news articles", Proc. of Intl. Conf. on Computational Linguistics, 2004, pp. 1-6.

Steinberger, et al. "JRC-NAMES: A Freely Available, High multilingual named entity resource", Proc. of Recent Advances in Natural Language Processing, 2011, pp. 14-16.

Stoyanov, et al. "Conundrums in Noun Phrase Coreference resolution: Making Sense of the State-of-the-Art", Proc. of the Joint Conf. of the 47$^{th}$ Annual Meeting of the ACL and the 4$^{th}$ Intl. Joint Conf. on Natural Language Proc. of the AFNLP, 2009, vol. 2, pp. 656-664.

\* cited by examiner

SYSTEM AND METHOD FOR RESOLVING ENTITY COREFERENCE

BACKGROUND

The exemplary embodiment relates to processing of text and finds particular application in connection with named entity coreference resolution.

A named entity is the name of a unique entity, such as a person, place, or thing. Identifying references to named entities in text is useful in many information access and question-answering systems. Named entity coreference resolution refers to the process of identifying different references to the same named entity. The problem is not only to find the correct entity for pronouns or implicit mentions, but also to recognize that the same named entity can appear with different superficial forms, due to spelling variants, use of parts of the complete name, acronyms, and so forth. The issue arises not only within a particular document (intra-document coreference resolution), but also when considering a set of documents and/or queries (inter-document coreference resolution).

Natural language processing systems often include a named entity recognition component which applies a set of rules for identifying named entities in text. These systems tend to over-generate named entities. This means that several different entities are generated for the same real named entity, favoring precision over recall.

News-media aggregators often wish to create clusters of news articles talking about one event. It would useful for them to be able to relate news articles to events through the actors (e.g., people and organizations) that took part in them. However, the over-generation of named entities combined with high frequency with which new named entities appear make this difficult.

Statistical methods for named entity co-reference resolution traditionally compute a similarity between two references to an entity in the text, and then collect some of these references into an equivalence cluster. Clustering can be achieved, for example, with coreference chains, tree traversal, or graph-cut algorithms (see, Vincent Ng et al., "Improving machine learning approaches to coreference resolution," Proc. Annual Meeting of Association for Computational Linguistics (ACL), pp. 104-111 (July 2002); Xiaoqiang Luo, et al., "A mention-synchronous coreference resolution algorithm based on the bell tree," Proc. ACL Annual Meeting, article 135 (2004); and Cristina Nicolae, et al., "BestCut: A Graph Algorithm for Coreference Resolution," Proc. Empirical Methods in Natural Language Processing, pp. 275-283 (July 2006)).

The similarity between two references can be computed using a variety of features, which can be grouped into lexical (string-based comparison), proximity (number of words or paragraphs between two references), grammatical (based on parts of speech, parse trees, and the like) and semantic (gender, animacy, and the like). See, Veselin Stoyanov, et al., "Conundrums in Noun Phrase Coreference Resolution: Making Sense of the State-of-the-Art," in Proc. Joint Conf. of the 47th Annual Meeting of the ACL and the 4th International Joint Conf. on Natural Language Processing of the AFNLP, Vol. 2, pp. 656-664 (hereinafter, Stoyanov, et al.). Some of these features are based on the content of the named entity; that is, on the superficial form it takes, some additional information provided by a syntactic parser, and on the local context given by surroundings words. Content-independent features relate only to the close context and thus are only intra-document.

Recently, it has been suggested that temporal information could be used for solving the coreference resolution problem. This method assumes that if two entities have the same temporal profile (in other words, when their bursts of appearances closely coincide) and if their approximate string matching similarity is below a defined threshold, these entities refer to the same real one. See, for example, Alexander Kotov, et al., "Mining named entities with temporally correlated bursts from multilingual web news streams," in WSDM, pp. 237-246, ACM, 2011. However, such methods are prone to noise.

Another study focused on multi-lingual named entity disambiguation. The main issue faced is the correct translation of person names and the subsequent comparison between these translations. The similarity between two named entities is computed through the following process: transliteration into roman script, lower-casing, name normalization, vowel removal and finally edit distance See, Ralf Steinberger, et al., "JRC-NAMES: A Freely Available, Highly Multilingual Named Entity Resource," Proc. Recent Advances in Natural Language Processing, pp. 14-16, 2011. An additional constraint is that, in order to merge two named entities, they have to appear in the same news cluster. This work resulted in the generation of a database of different name variants for the same named entity. The database, while a good resource for some applications, has a high-precision, low-recall rate and addresses only the most frequent named entities in the news sphere.

The present system and method provide more reliable named entity coreference resolution by add contextual "socio-temporal" features given by the clustering of the documents into topic-coherent events.

INCORPORATION BY REFERENCE

The following references, the disclosures of which are incorporated herein by reference, in their entireties, are mentioned:

The following relate generally to clustering of items: U.S. application Ser. No. 13/437,079, filed Apr. 2, 2012, entitled FULL AND SEMI-BATCH CLUSTERING, by Matthias Galle and Jean-Michel Renders (hereinafter, "Galle & Renders"); U.S. Pub. No. 20120030163, published Feb. 2, 2012, entitled SOLUTION RECOMMENDATION BASED ON INCOMPLETE DATA SETS, by Ming Zhong, et al.; U.S. Pub. No. 20110137898, published Jun. 9, 2011, entitled UNSTRUCTURED DOCUMENT CLASSIFICATION, by Albert Gordo, et al.; U.S. Pub. No. 20100191743, published Jul. 29, 2010, entitled CONTEXTUAL SIMILARITY MEASURES FOR OBJECTS AND RETRIEVAL, CLASSIFICATION, AND CLUSTERING USING SAME, by Florent C. Perronnin, et al.; U.S. Pub. No. 20080249999, published Oct. 9, 2008, entitled INTERACTIVE CLEANING FOR AUTOMATIC DOCUMENT CLUSTERING AND CATEGORIZATION; U.S. Pub. No. 20070239745, published Oct. 11, 2007, entitled HIERARCHICAL CLUSTERING WITH REAL-TIME UPDATING, by Agnes Guerraz, et al.; U.S. Pub. No. 20070143101, published Jun. 21, 2007, entitled CLASS DESCRIPTION GENERATION FOR CLUSTERING AND CATEGORIZATION by Cyril Goutte; and U.S. Pub. No. 20030101187, published May 29, 2003, entitled METHODS, SYSTEMS, AND ARTICLES OF MANUFACTURE FOR SOFT HIERARCHICAL CLUSTERING OF CO-OCCURRING OBJECTS, by Eric Gaussier, et al.

The following references describe the identification of named entities in natural language text: U.S. Pat. No. 7,171,350, entitled METHOD FOR NAMED-ENTITY RECOGNITION AND VERIFICATION, by Lin, et al.; U.S. Pat. No.

6,975,766, entitled SYSTEM, METHOD AND PROGRAM FOR DISCRIMINATING NAMED ENTITY, by Fukushima; U.S. Pat. No. 6,311,152, entitled SYSTEM FOR CHINESE TOKENIZATION AND NAMED ENTITY RECOGNITION, by Bai, et al.; U.S. Pat. No. 6,263,335, entitled INFORMATION EXTRACTION SYSTEM AND METHOD USING CONCEPT-RELATION-CONCEPT (CRC) TRIPLES, by Paik, et al.; U.S. Pub. No. 20080319978, published Dec. 25, 2008, entitled A HYBRID SYSTEM FOR NAMED ENTITY RESOLUTION, by Caroline Brun, et al.; U.S. Pub. No. 20090204596, published Aug. 13, 2009, entitled SEMANTIC COMPATIBILITY CHECKING FOR AUTOMATIC CORRECTION AND DISCOVERY OF NAMED ENTITIES, by Caroline Brun, et al.; U.S. Pub. No. 20100082331, published Apr. 1, 2010, entitled SEMANTICALLY-DRIVEN EXTRACTION OF RELATIONS BETWEEN NAMED ENTITIES, by Caroline Brun, et al.

U.S. Pat. No. 7,058,567, issued Jun. 6, 2006, entitled NATURAL LANGUAGE PARSER, by Aït-Mokhtar, et al., discloses a parser for syntactically analyzing an input string. The parser applies a plurality of rules which describe syntactic properties of the language of the input string.

BRIEF DESCRIPTION

In accordance with one aspect of the exemplary embodiment, a method for coreference resolution includes receiving a set of document clusters. Each cluster in the set includes a set of text documents. Instances of each of a set of candidate named entities are identified in the document clusters. For each of the candidate named entities, the method includes generating an event profile which is based on the identified instances of that candidate name entity in each cluster of the set of document clusters. A similarity is computed for a pair of the candidate named entities, based on their event profiles. A merging decision for the candidate named entities into a common real named entity is based on the computed similarity.

One or more of the steps of the method can be performed with a computer processor.

In accordance with another aspect of the exemplary embodiment, a system for coreference resolution includes memory which stores a set of document clusters; each cluster in the set comprising a set of text documents. An entity extractor is configured for identifying instances of each of a set of candidate named entities in the document clusters. A socio-temporal features extractor is configured for computing at least one socio-temporal feature for each of a set of pairs of the candidate named entities, based on event profiles for the candidate named entities in each pair. The event profiles each are based on the identified instances of the respective candidate name entity in each cluster in the set of document clusters. A prediction component is configured for outputting a similarity score for each pair of the candidate named entities, based on the at least one socio-temporal feature. A merging component is configured for merging the candidate named entities of a pair into a common real named entity, when the computed similarity score meets a threshold similarity score. A processor implements at least one of the socio-temporal features extractor and the prediction component.

In accordance with another aspect of the exemplary embodiment, a method for coreference resolution is provided. The method includes receiving a set of document clusters. Each cluster in the set includes a set of text documents. Instances of each of a set of candidate named entities in the document clusters are identified. For each of a plurality of pairs of the candidate named entities in the set, the method includes computing at least one socio-temporal feature which is based on a similarity between event profiles of the candidate named entities in the pair. Each event profile includes a vector where each index of the vector is based on the identified instances of the candidate name entity in a respective one of the clusters in the set of document clusters. For each of the pairs, the at least one socio-temporal feature is input to a classifier which has been trained to output a similarity score for a pair of candidate named entities based on the at least one socio-temporal feature. The candidate named entities of a pair are merged into a common real named entity, when the output similarity score meets a threshold.

DETAILED DESCRIPTION

Figure 1:
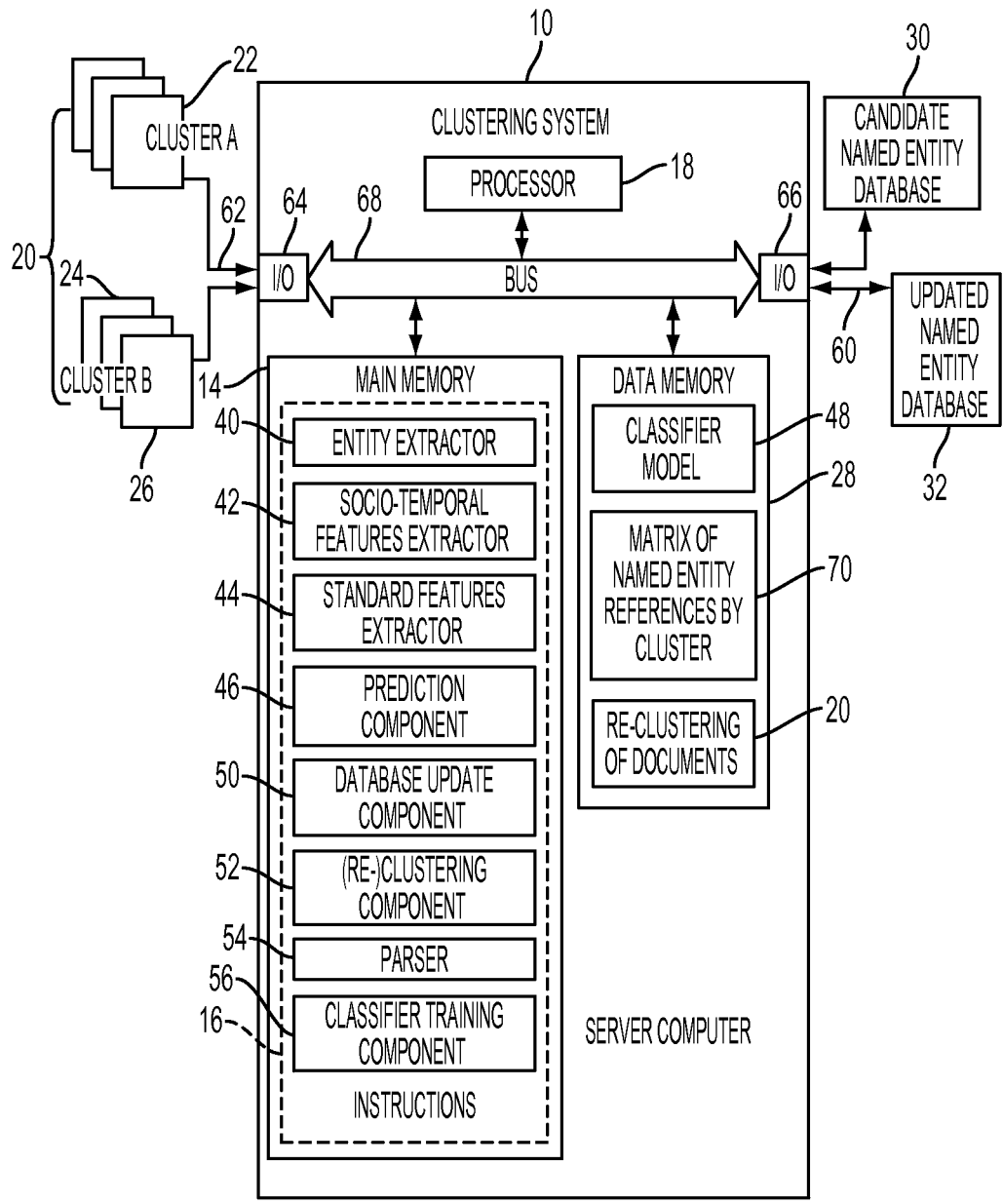
FIG. 1 is a functional block diagram of a system for coreference resolution in accordance with one aspect of the exemplary embodiment.

A system and method for coreference resolution are disclosed which exploit social as well as temporal aspects by taking into account events corresponding to clusters of related text documents.

A text document, as used herein, generally comprises one or more text strings, in a natural language having a grammar, such as English or French. In the exemplary embodiment, the text documents are all in the same natural language. A text string may be as short as a word or phrase but may comprise one or more sentences. Text documents may comprise images, in addition to text.

A named entity (NE) is a group of one or more words that identifies an entity by name. For example, named entities may include persons (such as a person's given name or role), organizations (such as the name of a corporation, institution, association, government or private organization), places (locations) (such as a country, state, town, geographic region, a named building, or the like), artifacts (such as names of consumer products, such as cars), temporal expressions, such as specific dates, events (which may be past, present, or future events), and monetary expressions. Of particular interest herein are named entities which are person names, such as the name of a single person, and organization names. Instances of these named entities are text elements which refer to a named entity and are typically capitalized in use to distinguish the named entity from an ordinary noun.

The exemplary named entity coreference system and method assume that a unique real named entity may have two or more references, referred to herein as candidate named entities (surface forms or aliases), which are used in different text documents and that, by mining the socio-temporal behavior of the these candidate named entities, it is possible to merge two (or more) of them into a single real named entity.

The exemplary embodiment is described in connection with news articles. However, it is to be appreciated that other types of text document are also contemplated, such as tweets and blog posts, mortgage applications, personal mailboxes, scientific papers, queries, and the like. In general, the method is suited to any dynamic temporal collection which offers the same properties, namely that documents report temporal interactions of real named entities (such as persons, organizations) in some real or virtual locations, so that there are correlations and hidden links between such entities that can help to solve coreference and disambiguation.

The exemplary method and system improve entity coreference resolution across a collection of documents that may already be organized/indexed by events. Here, the term "event" is to be generally understood as being a topic that is shared by a significant number of documents and that encompasses actors (persons, organizations) that are generally interacting in a restricted period of time and, potentially, in a limited (real or virtual) location. Each event thus corresponds to a cluster of documents. The method enables some candidate named entities to be inferred as referring to the same real named entity because they have the same or a similar "socio-temporal" profile, i.e., because they interact with the same other candidate named entity/entities during the same periods of time or, more particularly, because they appear in the same set of events, or at least share a significant overlap in their event profiles. Events thus act here as useful, synthetic contextual elements, including both social and temporal aspects.

News-media aggregators typically create clusters of news articles talking about one event, providing social and temporal co-occurrences of the entities mentioned by the articles. The present system and method may take advantage of such event clusters, making it possible to relate different surface forms used by different sources for the same entity, which would otherwise go undetected by a standard named entity coreference system. In some aspects, an automated method for generating clusters, which may be used herein to provide clusters of documents, is described in Galle & Renders (U.S. application Ser. No. 13/437,079), although other automated, semi-automated or manual clustering methods are also contemplated. Galle & Renders describes the clustering of documents, such as news articles, although the method is also applicable to other documents in which references to named entities are commonly found. The documents to be clustered may be received in batches, each batch corresponding a pre-determined time period, providing a temporal aspect to the clusters. The clustering is based on representations of words occurring in the documents, hence the clusters are considered to relate to a common event.

In addition to improving navigation and information access, the exemplary method for resolving coreference of named entities may be employed in a circular approach in which the improved coreference resolution may lead to more accurate event extraction (clustering with enhanced similarity measures) of the same or a different set of documents.

While the exemplary method may, in some embodiments, rely solely on the socio-temporal features to identify candidate named entities appropriate for merging, in general, it may be suitably used in combination with other features (or similarity/dissimilarity measures) in order to exploit other facets of how entities are expressed in a collection of text documents. In one embodiment, described in more detail below, the socio-temporal features extracted based on event profiles of candidate named entities are combined with an approximate string matching method to provide a more comprehensive entity coreference/disambiguation method. It is to be appreciated that the exemplary coreference method may alternatively or additionally employ other types of feature, in particular those derived from more elaborated syntactic parsing.

The method and system utilize a database of named entities (which may have been obtained through use of a parser). The system and method find relationships of synonymy between entries of this database. In other words, for a given real named entity, there may be multiple entries (candidate named entities) in the database, with different canonical strings.

In the exemplary embodiment, the system and method do not address the phenomenon of polysemy (also known as person name disambiguation when referring only to person names). This is the case where one entity in the text can refer to multiple real world entities. In practice, such cases appear much less frequently than the opposite case, which is the case here (mapping many to one rather than one to many). Additionally, such cases can generally be handled correctly by a conventional parser. However, it is contemplated that the exemplary system and method may incorporate processing components for such cases.

FIG. 1 illustrates an exemplary system 10 for coreference resolution. The system includes one or more computing devices, such as the exemplary server computer 12. The computer includes main memory 14 which stores instructions 16 for performing the exemplary method and a processor 18, in communication with the memory 14, for executing the instructions.

The system receives as input a set 20 of document clusters 22, 24, etc. There are at least two clusters in the set 20, and in the exemplary embodiment, at least 5, or at least 10, or at least 20, or at least 100 clusters, or more. Each cluster includes a set of text documents 26, all relating to a common event. The system may receive as input the documents themselves, or information extracted therefrom, such a word occurrences, extracted from the documents. Some or all of the clusters may include at least 2, or at least 5, or at least 10, or at least 20 documents 26, or more. The clusters 22, 24 may vary in the number of documents 26 that they contain. In general, each document 26 appears in exactly one cluster. The documents 26 and their cluster assignments are stored in data memory 28 during processing.

The set 20 of clusters may result from batch processing or may otherwise be limited to a specified timespan. For example, the set 20 of clusters includes documents which arrived (or were generated) within the same given timespan of, for example, 1 hour or 1 day. The method may be repeated as each new set 20 of clusters arrives. In general, the clusters 22, 24 in the set include documents 26 which overlap in terms of the instances of candidate named entities that they contain. For example, one document in one cluster may include instances of candidate named entities A and B, while another document in that cluster includes instances of candidate named entities B, C, and D, and so forth. Additionally, there is overlap between clusters, such that, for example, candidate named entities A and D both occur in clusters 1 and 2 but not in clusters 3-10, or with a lower frequency. This information is used by the exemplary method to help determine whether candidate named entities A and D should be considered as referring to the same named entity.

The candidate named entities are stored in a candidate named entity database 30. It is assumed that some of the candidate NEs in the database 30 refer to the same real named entity. Thus, for example, candidate named entities A and D may be different surface forms of the same real named entity. The method seeks to identify these cases based on socio-temporal features generated from the set 20 of clusters and thereby generate an updated named entity database 32, in which the different surface forms are linked to the same unique real named entity.

The instructions 16 may include an entity extractor 40, which processes the documents 26 to identify instances of the candidate named entities, which appear in the candidate named entities database 30.

A socio-temporal features extractor 42 extracts socio-temporal features for some or all of pairs of the candidate named entities in the candidate NE database 30. The socio-temporal features are based on the cluster co-occurrences of the instances of the candidate named entities which have been found in the documents 26, as described in greater detail below.

A standard features extractor 44 may also be provided, which extracts other, more standard features, such as one or more of lexical features (string-based comparison), proximity features (number of words or paragraphs between two instances, grammatical features (based on parts of speech, parse trees, and the like) and semantic features (gender, animacy, and the like). By way of example, the standard features extractor 44 computes string-based comparison features, such as the edit distance between two text strings and the number of common words, for the candidate named entity pairs.

A prediction component 46 feeds the socio-temporal features to a classifier model 48, such as a binary classifier, optionally in conjunction with the intra-document features. Based on the classifier output, a database update component 50 makes a merging decision, which either assigns the pair of candidate named entities to a single real named entity in the updated named entity database 32, or otherwise, the pair of candidate named entities are not joined in this way. The updated named entity database 32 links each real named entity to those of the candidate named entities which are assigned to it.

A clustering component 52 may be used refine the input clusters 22, 24, based on the updated named entity database 32. This component may perform analogously to the clustering component described in Galle & Renders, except that surface forms in the documents 26 which refer to the same real named entity are tagged as such and/or treated as being the same, prior to executing the clustering algorithm. The clustering component 52 may also perform the initial clustering of the documents.

The system 10 may further include a named entity extraction component 54, such as a linguistic parser, for generating the candidate NE database 30, if it has not already been generated. As will be appreciated, the parser 54 may also serve as the entity extractor 40, optionally, in slightly modified form, later on. The system 10 may also include a classifier training component 56 for training the classifier model 48, if this has not already been done.

Databases 30, 32 may be stored in local memory, such as data memory 28, or in remote memory accessible to the system by a link 60, such as a wired or wireless link, e.g., a local area network or a wide area network, such as the Internet.

The set 20 of document clusters may be input to the system 10 from any suitable memory storage device, such as a disk, flash memory, external computer hard drive, e.g., via a wired or wireless link 62, as for link 60. In other embodiments, the clusters 22, 24, etc. are generated by the system 10 from a set of input documents, using a clustering component 52, such as that described in Galle & Renders.

The system 10 may include one or more input/output devices (I/O) 64, 66 for communication with external devices via links 60, 62. Hardware components 14, 18, 28, 64, 66 of the system 10 may be communicatively linked by a data/control bus 68.

The memory 14, 28 may represent any type of non-transitory computer readable medium such as random access memory (RAM), read only memory (ROM), magnetic disk or tape, optical disk, flash memory, or holographic memory. In one embodiment, the memory 14, 28 comprises a combination of random access memory and read only memory. In some embodiments, the processor 18 and memory 14 and/or 28 may be combined in a single chip. The network interface 64, 66 allows the computer to communicate with other devices via a computer network, such as a local area network (LAN) or wide area network (WAN), or the internet, and may comprise a modulator/demodulator (MODEM).

The digital processor 18 can be variously embodied, such as by a single-core processor, a dual-core processor (or more generally by a multiple-core processor), a digital processor and cooperating math coprocessor, a digital controller, or the like. The processor 18, in addition to controlling the operation of the computer, executes instructions stored in memory 14 for performing the method outlined in FIG. 2. The system may be embodied in one or more computing devices, such as a server computer, desktop, laptop, tablet computer, combination thereof, or any other computing device(s) capable of performing the method.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 1 is a high level functional block diagram of only a portion of the components which are incorporated into a computer system 10. Since the configuration and operation of programmable computers are well known, they will not be described further.

Figure 2:
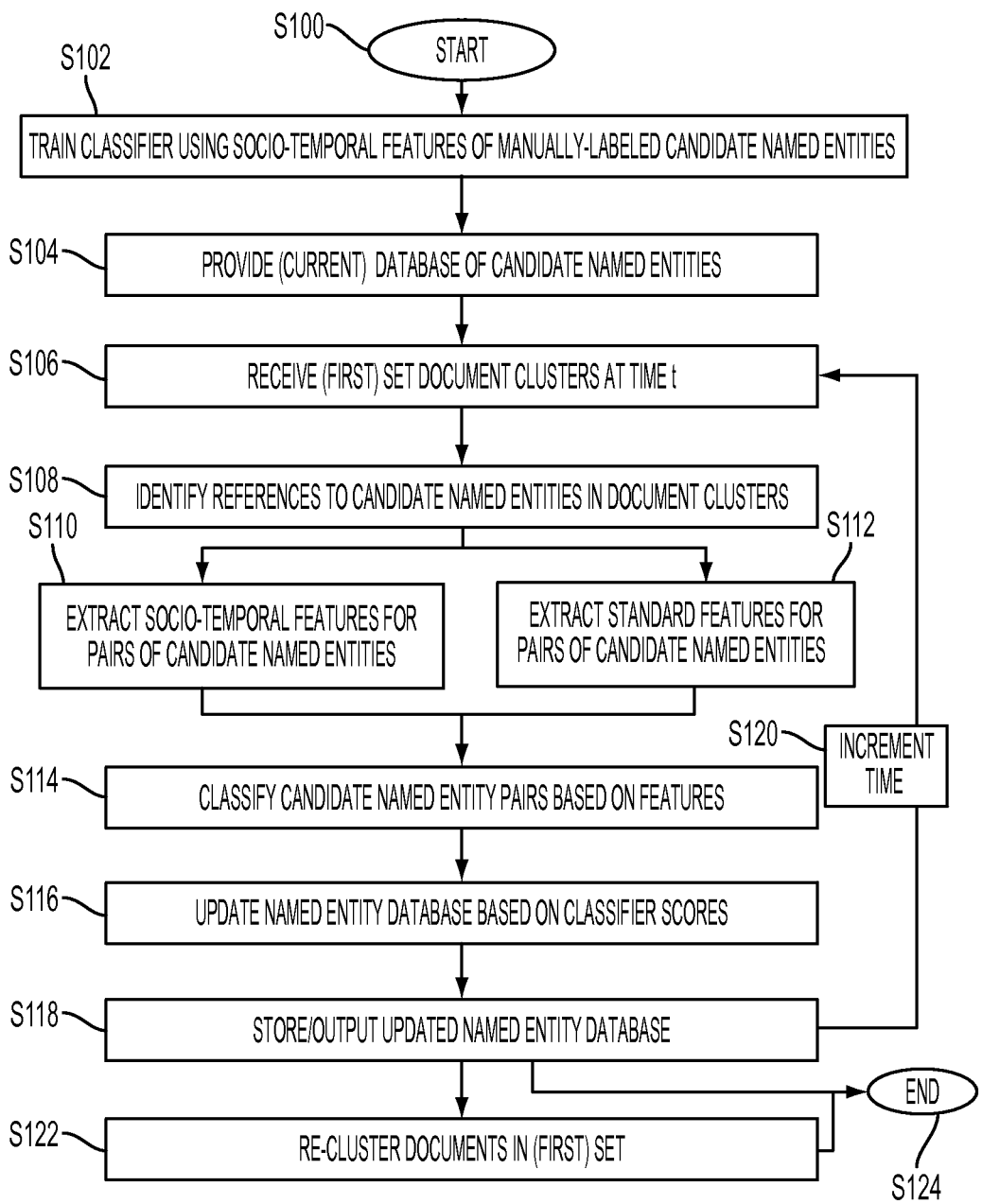
FIG. 2 is a flow chart illustrating a method for coreference resolution in accordance with another aspect of the exemplary embodiment.

FIG. 2 illustrates an exemplary method for coreference resolution, which may be performed with the system illustrated in FIG. 1. The method begins at S100.

At S102, a classifier 48 is trained using socio-temporal features and optionally standard features computed for pairs of candidate named entities and corresponding manually-identified real named entities for each pair.

At S104, a database 30 of candidate named entities is provided. For example, the named entity extractor (parser) 54 is used to identify candidate named entities in a set of documents, which may be the same as the documents in the set 20 and/or which may be a previously-received, different set of documents with little or no overlap with set 20.

At S106, a set 20 of two or more document clusters 22, 24 is received and may be stored in data memory 28. The set 20 may correspond to a discrete time interval t. Each document cluster 22, 24 includes at least one document 26, and at least some of the clusters include two or more, and generally several documents.

At S108, instances of the candidate named entities that appear in the database 30 are identified in the documents 26 of each of document clusters 22, 24, by the entity extractor 40.

At S110, socio-temporal features are extracted for pairs of the candidate named entities, by the socio-temporal features extractor 42, based on event profiles of the candidate named entities. The event profiles are each based on the identified instances of the respective candidate named entity in each of the clusters, and may take the form of a vector where each index is representative of instances of the candidate named entity in a respective one of the clusters.

At S112, standard features may be extracted for pairs of the candidate named entities, by the standard features extractor 44. As will be appreciated, the socio-temporal and standard features can be extracted in any order or at the same time. If standard features are not used for classification, they may be used in a filtering step to exclude pairs of candidate named entities from further consideration which do not meet a predetermined threshold for each of these features.

At S114, the socio-temporal features (and optionally, the standard features) are input to the trained classifier 48, by the prediction component 46. The classifier outputs a score for each pair, which corresponds to the probability that the pair refer to the same real named entity.

At S116, the named entity database 30 is updated to link pairs whose scores meet a threshold to the same named entity. Based on a score output by the classifier for a given pair, a merging decision is made by the database update component 50: the pair is either linked to a common real named entity or maintained as separate named entities and the database 32 is generated by updating the current candidate named entity database. At S118 the updated named entity database 32 is stored in local or remote memory, output, and/or used (e.g., by the system) in a further process.

At S120, after an increment of time to t+1, a new set of document clusters may be received and the method may return to S106. The method is repeated, optionally with the updated named entity database 32 serving as the current candidate named entity database 30. In other embodiments, a new candidate named entity database 30 may be formed, for example, by applying the parser 54 to the new set of documents 20 received at time t+1 and adding any newly-identified candidate named entities to the named entity database 30 or updated database 32, which then serves as the current candidate named entity database 30. The regeneration of database 30 may be performed intermittently, rather than every cycle, if new sets of documents are received at relatively short intervals. The method may be repeated for each new set of documents.

In some embodiments, at S122, the set 20 of document clusters received at S106 may be re-clustered, based on the updated named entity database 32.

The method may end at S124.

At least a part of the method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method(s) may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method.

Further details of the system and method will now be provided.

Classifier Training (S102)

The socio-temporal features are based on the occurrences of a set of candidate named entities in a set of clusters of training documents. The training documents and candidate named entities extracted from them are generally not the same as the later-used set 20, although there may be some overlap. The socio-temporal features and standard features used in training the classifier 48 may be extracted in the same way as for the socio-temporal features and standard features used for the pairs of candidate named entities extracted from the later-received set 20 of documents (see below). The manually-identified real named entities may indicate, for each pair, whether or not the candidate named entities should be assigned to the same real named entity, i.e., a binary label for each pair.

Any suitable method can be used for training the classifier 48, such as logistic regression, sparse logistic regression, support vector machines (SVM), classification trees, K-nearest neighbors, naïve Bayes classifier, or the like. For training, all the manually identified positive examples can be used, together with at least as many negative samples (pairs of entities that are not manually labeled as being equivalent). The negative samples can be drawn randomly from the training data or manually selected so as to be close with respect to at least one feature. In one embodiment, the classifier learns weights for each of the socio-temporal and standard features such that a dot product or other function of the weighted feature values for a pair of candidate named entities outputs a score that optimizes the correspondence with the label for the pair, over all the training samples.

Generation of the Candidate Named Entity Database (S104)

The candidate named entity database 30 may be generated using any suitable named entity extraction component 54. By way of example, the Xerox Incremental Parser (XIP) may be used for this task. See, U.S. Pat. No. 7,058,567, entitled NATURAL LANGUAGE PARSER, by Aït-Mokhtar, et al.; Salah Aït-Mokhtar, Jean-Pierre Chanod, and Claude Roux, "Robustness beyond shallowness: incremental dependency parsing," in special issue of the NLE Journal (2002); Aït-Mokhtar, et al. "Incremental Finite-State Parsing," Proc. Applied Natural Language Processing, Washington, April 1997; and Aït-Mokhtar, et al., "Subject and Object Dependency Extraction Using Finite-State Transducers," Proc. ACL'97 Workshop on Information Extraction and the Building of Lexical Semantic Resources for NLP Applications, Madrid, July 1997.

As will be appreciated, only a limited part of the functionality of such a linguistic parser is needed for extraction of the named entities. Other named entity extraction methods are also contemplated, such as those disclosed in U.S. Pat. No. 7,171,350, entitled METHOD FOR NAMED-ENTITY RECOGNITION AND VERIFICATION, by Lin, et al.; U.S. Pat. No. 6,975,766, entitled SYSTEM, METHOD AND PROGRAM FOR DISCRIMINATING NAMED ENTITY, by Fukushima, the disclosures of which are incorporated herein by reference in their entireties.

As noted above, the named entity extraction component 54 tends to over-generate named entities, resulting in there being two or more candidate named entities that are able to be linked to the same real named entity by the system 10.

Cluster Generation (S106)

The clusters 22, 24, etc. may have been generated automatically according to the method of Galle & Renders. That application describes an iterative process, which starts with assigning each of a set of data points to a respective cluster, each of the data points representing a respective document. In the case of text documents, the data points can each be a vectorial representation of word frequencies in at least a portion of the respective document, such as the first 100 words. A term frequency—inverse document frequency (TF-IDF) vector is a suitable representation. In the Galle & Renders method, a plurality of iterations is performed. At each iteration, the data points are clustered among the clusters by assigning the data points to the clusters based on a comparison measure of each data point with a representative point of each cluster, which may be computed using a kernel function. A threshold of the comparison measure is used to exclude data points that are not sufficiently similar, while allowing data points to be assigned to more than one cluster (soft clustering). Based on the clustering, a new representative point for each of the clusters is computed, which is used for the next iteration. At the end of the process, the documents can then be assigned to a respective one of the clusters (hard clustering) or maintained as soft clusters. In the exemplary embodiment, the clusters are hard clusters, i.e., each document 26 is assigned to exactly one cluster. The documents in each cluster 22, 24 are considered to refer to the same respective event.

Thus for example, in the case of news articles, a news aggregator may at suitable time intervals t, crawl news feeds for new documents, such as news articles, which have been posted since the last time at which a set of documents was posted. The new documents are then clustered by the system of Galle & Renders to generate the set 20 of clusters. The clusters are thus limited temporally to the time period t over which the documents 26 in the set were posted and/or collected.

Other ways of generating clusters which are temporally related are also contemplated. For example, the documents may have been clustered with a hard clustering algorithm that takes into account temporal aspects, in particular by discounting the similarity of documents that are published at two very different times.

Identification of Instances of Candidate Named Entities (S108)

Figure 3:
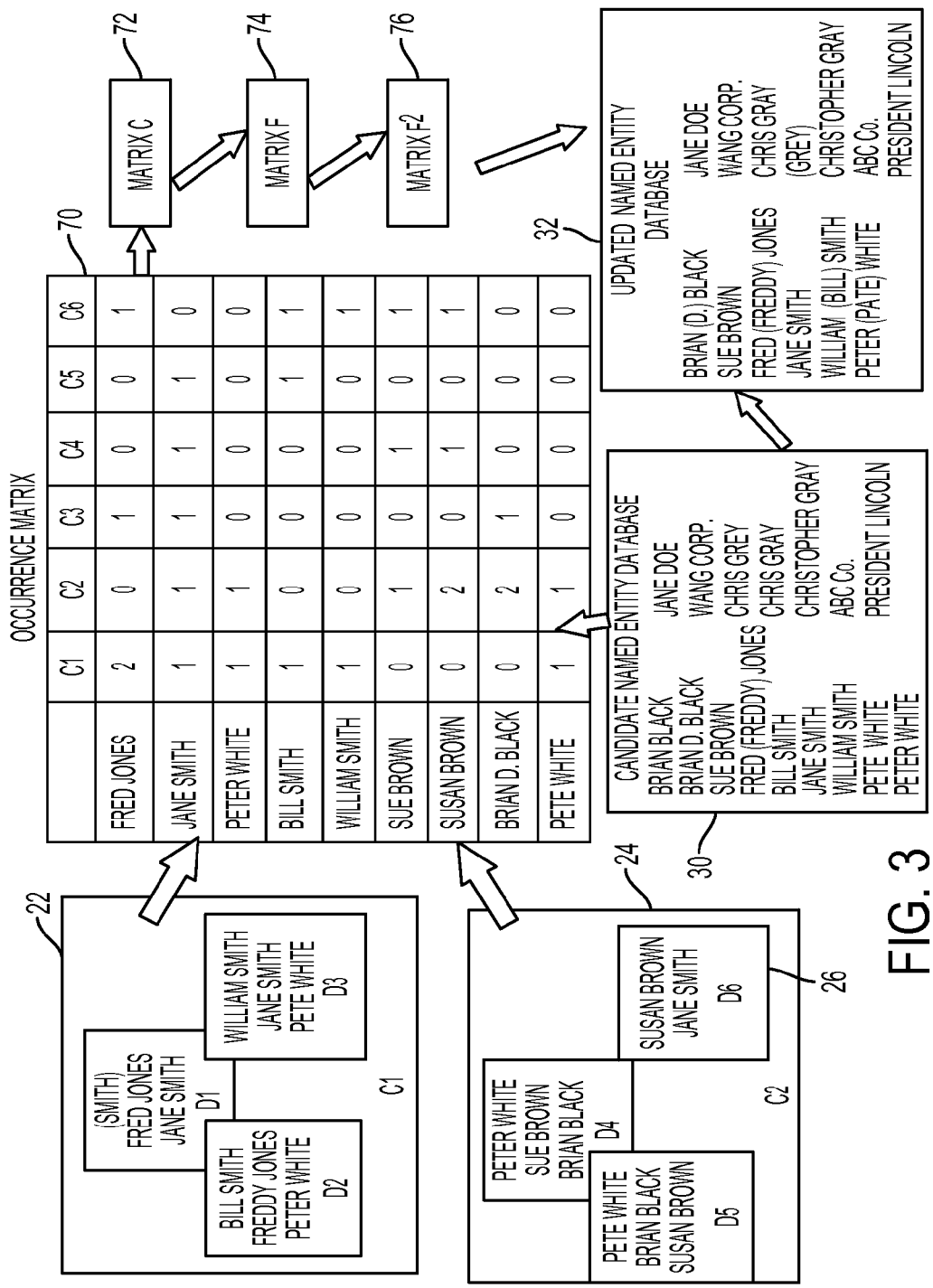
FIG. 3 is a simplified illustration of extraction of socio-temporal features from document clusters and updating of a named entity database.

The instances identified in the text of the documents may be surface forms of the candidate NEs stored in the database 30. One or more surface forms may be already linked to a given candidate named entity in the candidate NE database 30. For example, as illustrated in FIG. 3, if the candidate named entity database 30 recognizes Freddy Jones as being the same person as Fred Jones, this information may already be stored in the candidate NE database 30. The entity extractor 40 used for identifying the instances can be any suitable linguistic processor, such as a parser, which partitions the text strings, e.g., sentences, of the document 26 into tokens, possibly filters the tokens to identify those that serve as noun phrases (nouns and longer phrases which serve as nouns) in the sentences, and compares these noun phrases to the list of candidate named entities in the database 30 to identify matching instances.

With reference to FIG. 3, as a very simplified example, suppose that over a first time period t, a first cluster C1 is generated which includes a set of documents D1, D2, D3 and a second cluster is also generated which includes documents D4, D4, D6. Several instances of the candidate named entities are found in these documents, illustrated by the names shown on the respective documents. Assume that all of these entities (except "Smith"), are found in the database 30. Then, a matrix of cluster occurrences can be generated, with one entry for each candidate named entity and each cluster. FIG. 3 illustrates an exemplary occurrence matrix 70, which shows the number of occurrences of each of a small set of the candidate named entities for a set of six clusters, C1-C6, which could be generated in this process. As will be appreciated, the number of clusters, number of candidate named entities, and number of occurrences would, in practice, often be much larger than this.

Extraction of Socio-Temporal Features (S110)

The events (as represented by clusters 22, 24, etc.) serve as socio-temporal context for defining the socio-temporal features. The exemplary socio-temporal features are based on a similarity between respective distributions of instances of two candidate named entity among the clusters. In particular, for each candidate named entity $e_i$ in the database 30, an event profile, such as a vector $\vec{e}_i$, of size k, is defined, where k is the total number of events (clusters). Each vector contains, at index i, a value which is based on the occurrences of candidate named entity $e_i$ in the event cluster i. In one embodiment, the value may be the number of occurrences (a raw occurrence value), as determined by the entity extractor 40, or in other embodiments may be a binary value indicating presence/absence of $e_i$ in cluster i. In yet other embodiments, the value at index i, is a weighted function of one or both of these values. For example the raw occurrence value may be weighted such that events that include a larger number of participants (candidate named entities) are weighted less than those with fewer number of participants, analogous to the tf-idf weighting scheme.

In the resulting vector $\vec{e}_i$, the occurrence values may be normalized, e.g., $l_2$ normalized, such that the values in each vector sum to 1. While $l_2$ normalization is considered in the exemplary embodiment, is to be appreciated that any suitable normalization which allows a meaningful comparison between two vector representations to be computed may be considered. In some cases, normalization is not performed.

For example, based on the occurrence matrix 70 shown in FIG. 3, the $l_2$ normalized vector (event profile) for Fred Jones may be represented as follows: (0.5, 0, 0.25, 0, 0, 0.25), while those for Peter White and Pete White are both: (0.5, 0.5, 0, 0, 0, 0), for the given discrete time period t over which the documents forming the clusters were collected/generated, as illustrated in the normalized occurrence matrix C 72, shown FIG. 4.

The socio-temporal feature(s) are a function of the similarity between event profiles of a pair of candidate named entities. One or more socio-temporal features can be extracted for a given pair of candidate named entities, based on occurrence vectors derived from the occurrence matrix 70.

For example, let C be the matrix 72 whose rows are the $\vec{e}_i$ vectors ($l_2$ normalized). Socio-temporal features for a candidate pair of entries $(e_i, e_j)$ can be obtained from elements of two similarity matrices 74, 76 as follows:

1. First-order similarity: this corresponds to the elements of the matrix 74 given by $F=CC^t$; this is the similarity of two named entities, measured as the similarity of their event profiles. Similarity can be computed by any suitable method for computing the similarity between two vectors, such as the cosine of the normalized event-profiles $\vec{e}_i$ of the two candidate named entities. Two candidate named entities are thus considered similar if they participate in the same or a similar set of events;

2. Second-order similarity, corresponding to the elements of a matrix FF, i.e., $F^2$; this measures the similarity of the event profiles of candidate named entities with which each candidate name entity interacts. Two candidate NEs are thus similar if they interact with the same candidate NEs. This is analogous to the Generalized Vector Space model, used in Information Retrieval. This matrix 76 may be computed by multiplying matrix F by itself.

Figure 4:
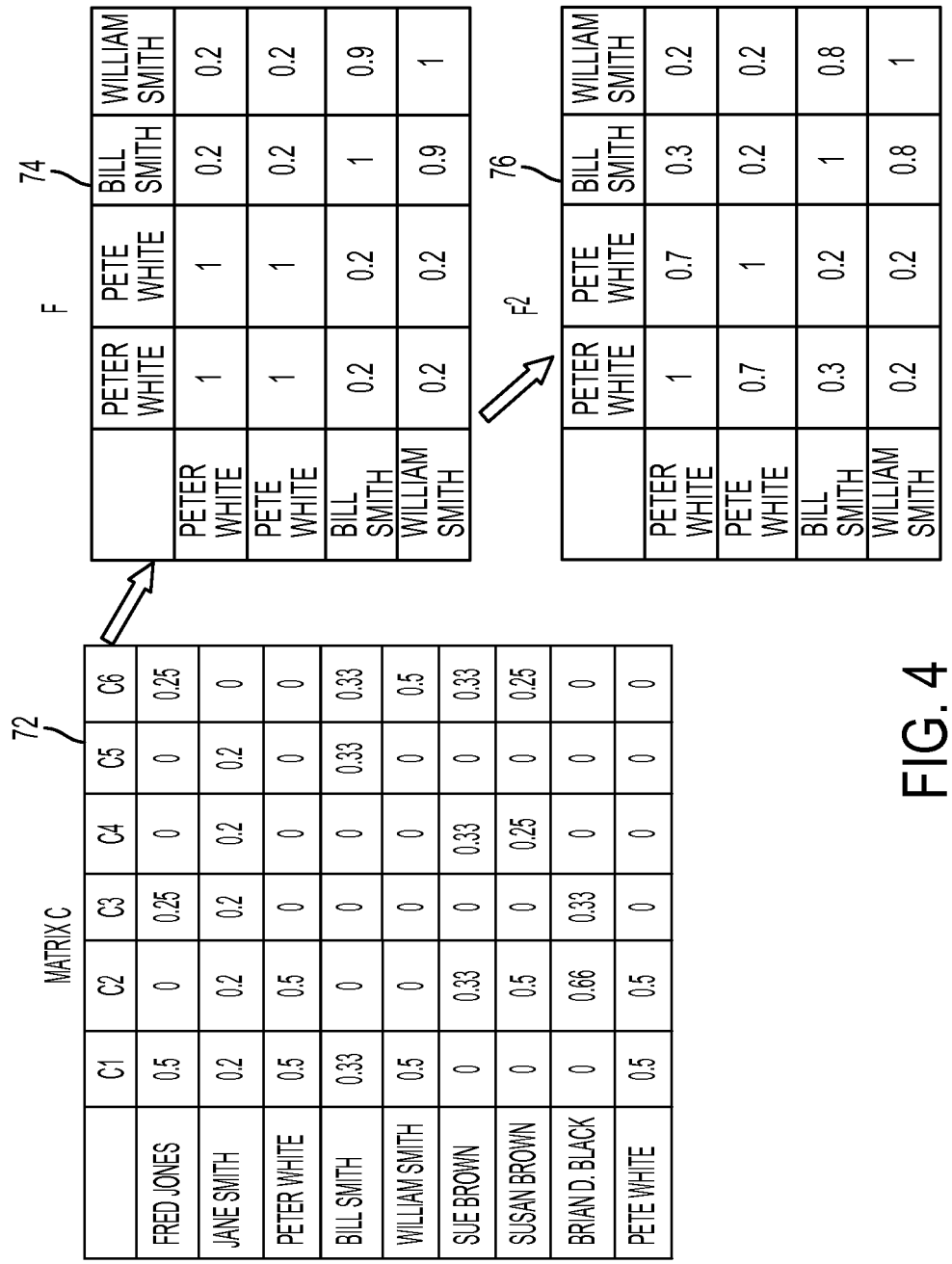
FIG. 4 is a simplified illustration of generation of feature matrices in the method illustrated in FIG. 3.

For example, the occurrence matrix 70 shown in FIG. 3 may be used to generate a matrix C as shown in FIG. 4 at 72, by normalizing each of the rows. The rows in matrix C are the event profiles of the named entities listed in the left hand column. Given matrix C, an F matrix 74 and an $F^2$ matrix 76 can be computed (the matrices 74, 76 illustrated are not intended to represent the actual values computed and show values for only a subset of the candidate named entities).

The two social features $s_{social}$ extracted from the matrices 74, 76 for a candidate pair of entries $(e_i, e_j)$ are then:

$$s_{social\,F}(e_i, e_j) = F[i,j]$$

and $$s_{social\,F^2}(e_i, e_j) = F^2[i,j].$$

As will be appreciated, only one or both of these features may be used.

For example, for the pair of candidate named entities Peter White and Pete White, the socio-temporal feature extractor 42 may access the F matrix 74 to retrieve the value of 1 as feature $s_{social\,F}$ and access the $F^2$ matrix 76 to retrieve the corresponding value of 0.7 as feature $s_{social\,F^2}$.

Extraction of Standard Features (S112)

As examples of standard features, one or more of the following string similarity features may be used as input for a candidate pair of entries $(e_i, e_j)$ corresponding to the pair of canonical strings $(s_i, s_j)$ which compose them:

1. Edit Distance:

This feature is based on the edit distance between the two candidate named entities and may also be a function of a length (number of characters including white spaces between words) of one or both candidate named entities. This edit distance feature may be computed according to:

$$s_{edit}(e_i, e_j) = 1 - \frac{d_{edit}(s_i, s_j)}{\max(|s_i|, |s_j|)},$$

where $d_{edit}$ is the standard edit distance and $|s_i|$ is the string length (in number of characters). The standard edit distance, or Levenshtein distance, is the minimum number of edits needed to transform one string into the other, with the allowable edit operations being insertion, deletion, or substitution of a single character;

2. Words in Common:

This feature is based on the amount of overlap, in number of words, between the two candidate named entities of the pair and may also be a function of the number of words in one or both of the two candidate named entities. This may be computed according to:

$$s_{commonW}(e_i, e_j) = \frac{|w(s_i) \cap w(s_j)|}{\max(|w(s_i)|, |w(s_j)|)},$$

where $w(s)$ is the set of words of the string s and $|w(s)|$ is the number of words in s; and Thus, for example, given the pair Pete White and Peter White, the standard features extractor 44 can extract:

$$s_{edit}(\text{Pete White, Peter White}) = 1 - \frac{1}{\max(10, 11)} = 0.901,$$

and/or $$s_{commonW}(\text{Pete White, Peter White}) = \frac{1}{\max(2, 2)} = 0.5$$

The method is not limited to these features and other standard features commonly used could be employed, such as:

head noun matching: how similar is the word which serves as the head in each of the canonical strings forming the pair, proximity: such as sentence and paragraph distance of two candidate NEs that appear in the same document;

grammatical: syntactic properties of the candidate NEs, These features can be based on part-of-speech tags, parse trees, or dependency relations. For example one feature could be based on whether the candidate named entities are more commonly used as syntactic subjects or syntactic objects in the documents;

semantic: these may capture semantic information, such as by applying tests for gender and animacy on sentences in which the candidate named entities are found, or on semantic compatibility based on Word-Net, and semantic comparisons of NE types.

See, for example, Stoyanov, et al. Additionally or alternatively, other standard features used in comparing text strings may be used.

Classifier Scoring (S114)

As discussed above, the binary classifier 48 is trained (at S102) on corresponding socio-temporal feature(s) and standard features extracted from pairs of candidate named entities in an annotated collection of documents in the same way as for the socio-temporal feature(s) and standard features extracted at S110, S112, and where entries $(e_i, e_j)$ referring to the same real entity have been identified manually.

Inputs to the classifier 48 at S114 include the features (socio-temporal feature(s) and standard feature(s)) for a pair of candidate named entities $(e_i, e_j)$, while the output can be a score reflecting the probability that the pair of candidate named entities $e_i$ and $e_j$ refer to the same real NE e. A threshold may be established which converts the score to a binary value. If the score is at or above the threshold, the database update component 50 assigns the pair of candidate named entities to a single real named entity in the updated named entity database 32, otherwise, the pair of candidate named entities are not joined in this way.

Thus for example, the set of features (1, 0.7, 0.901, 0.5) or a normalized representation thereof, is input for the example pair (Pete White, Peter White). Assuming that the score output by the classifier for this set of features is higher than the predefined threshold, the two candidate named entities are merged into a single named entity in the update step (S116).

At S122, the re-clustering component 52 may refine the input clusters, based on the updated named entity database 32. This component may perform analogously to the clustering component described in Galle & Renders, except that surface forms in the documents which refer to the same real named entity are tagged as such and/or treated as being the same.

As noted above, the method is suited to batch processing of document clusters, where a first batch (set of clusters) arrives at a first time and a second batch (set of clusters) arrives at a later time. The clusters received in the second, and subsequent sets may be generated according to the method of Galle & Renders, in which subsequent documents are assigned, where possible, to the clusters previously generated. After a period of inactivity for a given cluster (no new documents added from one or several document sets), that cluster may be retired. In some embodiments, the retired clusters may be no longer considered by the present system 10. The clusters received by the system at S106 may include only the new documents added to the clusters for the given time period, or may also include previously received documents.

The exemplary system 10 and method may be incorporated into or incorporate an existing named entity recognition system, such as one or more of those described in the references mentioned above. The system and method may alternatively or additionally be applied in an information system structured around events (as previously noted, events are clusters of coherent documents, capturing the interactions of a restricted set of actors in a limited period of time). For example, in the case of extracting information from forms, the ability to recognize that two different surface expressions (due to misspelling errors or legal variants of names) refer to the same entity, such as a customer or supplier, can be of significant value.

Without intending to limit the scope of the exemplary embodiment, the following example describes the application of the method to a set of news articles.

EXAMPLE

The impact of the socio-temporal features was evaluated in a simplified framework. The objective was not necessarily to maximize the final accuracy, but to analyze the impact of adding these new features to existing ones. In order to analyze the impact of the socio-temporal features for the named entity co-reference task, the TDT5 news article corpus was used (see www.ldc.upenn.edu/Projects/TDT5). This collection includes about 280,000 documents. The method was limited to articles from this corpus written in English. Each document was linguistically processed by the XIP parser. This preprocessing included some coreference resolution (both at the intra- and inter-document levels), but with a bias to high precision and low recall, as noted above.

An event extractor (clustering component) was run on this collection to provide clusters. The extractor is a hard clustering algorithm that takes into account temporal aspects, in particular by discounting the similarity of two news articles that are published at two very different times. The application of the event extractor resulted in about 75,000 events (clusters). An entity is considered to participate in an event as soon as it appears in one of the articles that are members of the event.

To train the classifiers, some entries (called "seeds") were taken randomly from the entity database 30 and, for each of these seed entries, equivalence classes were generated by manually regrouping them with the other entries (and, therefore, other canonical strings) that refer to the same real entity. In this way 1157 pairs were obtained involving 5557 entries (if an equivalence class contains more than two entries, all possible pairs were formed, so that one entry could be included in more than one pair).

Two classifiers were trained using logistic regression on these seed pairs and other pairs drawn as negative samples. The first one $C_{content}$ serves as a baseline classifier and used only the standard features ($s_{edit}$ and $s_{commonW}$, as defined above). The second one, $C_{content+social}$, implemented the exemplary method by including also the socio-temporal features ($s_{social}$):

$$s_{social\,F}(e_i,e_j)=F[i,j] \text{ and}$$

$$s_{social\,F^2}(e_i,e_j)=F^2[i,j], \text{ as defined above.}$$

Figure 5:
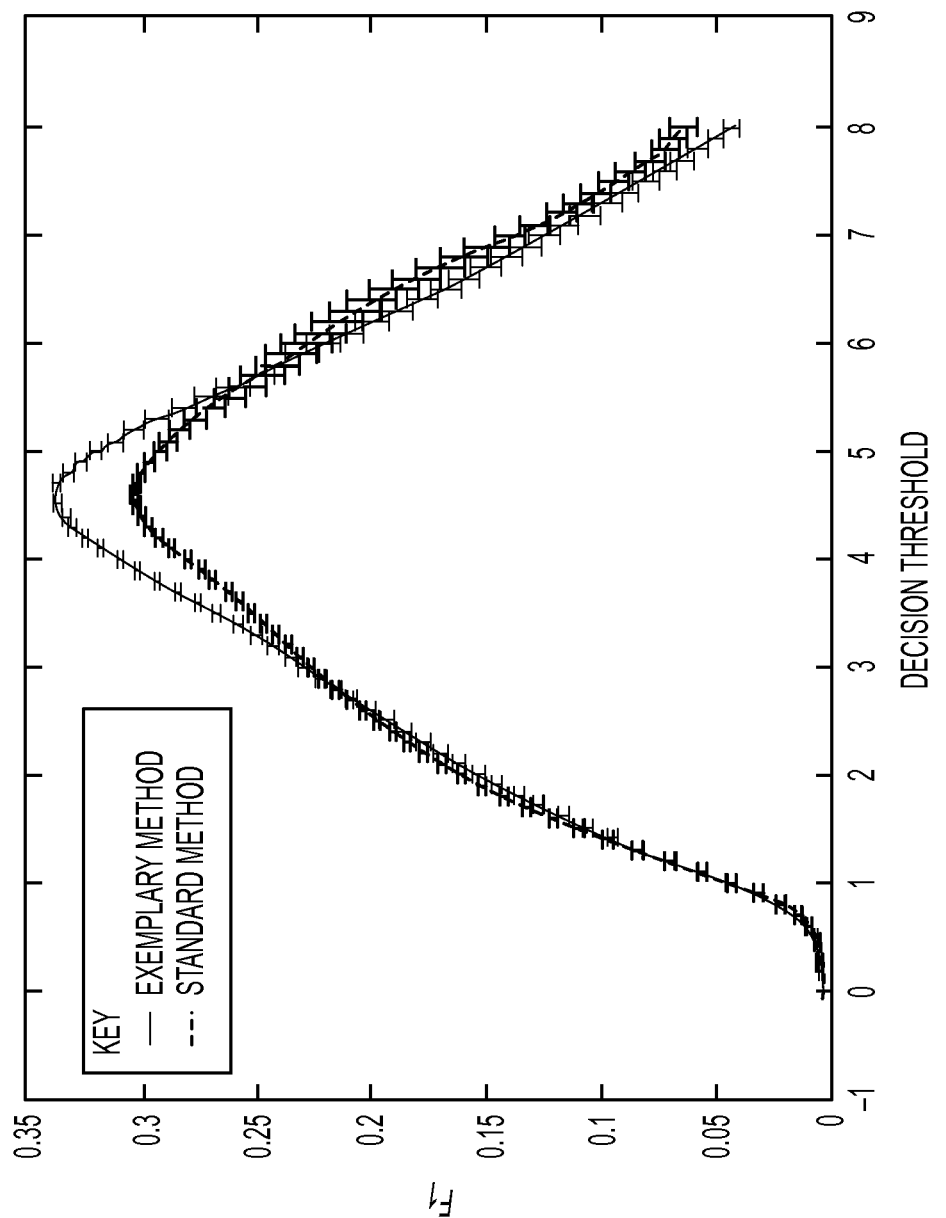
FIG. 5 is a plot comparing performance results (I measure) versus decision threshold of the exemplary method and a comparative method without socio-temporal features.

One third (randomly selected) of the equivalence classes were used for training the classifiers and the classifiers were tested on the remaining equivalence classes. This was performed 100 times (runs), each time with different randomly chosen training sets. For training, all p positive examples given by the equivalence class were used and p random negative examples were added. These negative examples were restricted to a set of entries that were 'close' enough with respect to at least one feature. For testing, the classifier was applied on the pairs of the remaining equivalence classes but also on (negative) pairs formed by taking entries co-occurring with the seeds in pre-defined stories (these are part of the TDT5 collection: where articles are annotated by stories), so that the evaluation focused primarily on the most challenging pairs of entries to be analyzed. The decision of the classifiers was binarized using different thresholds. The results are shown in FIG. 5, averaged over the 100 runs. The x axis corresponds to the threshold at which a decision is made to merge two named entities. The y axis corresponds to the $F_1$ measure, which is a conventional measure for assessing a test's accuracy and is a function of the precision and recall values.

As can be seen, for lower threshold values, adding the social feature does not impact the performance result. In the extreme upper range it may lower the performance (although the difference is small). However, in the middle range, where a decision threshold would normally be established, the additional social features improve the $F_1$ value by about 10%.

As can be seen, performance results in all cases are rather low. However, it is to be appreciated that these results may be improved by adding other standard and/or socio-temporal features. Additionally, it should be noted that no feature engineering was performed, and that the data used was particularly challenging.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for coreference resolution comprising:
receiving a set of document clusters, each cluster in the set of document clusters comprising a set of text documents;
identifying instances of each of a set of candidate named entities in the document clusters, the instances of a respective candidate named entity being text elements;

for each of the candidate named entities, generating an event profile, the event profile comprising an optionally normalized vector of size k, where k is the number of document clusters in the set, in which each index of the vector is based on the occurrences of the identified instances of the candidate named entity in a respective one of the k clusters;

with a processor, computing a similarity between a pair of the candidate named entities based on their respective event profiles; and providing a decision for merging of the candidate named entities into a common real named entity, based on the computed similarity.

2. The method of claim 1, wherein the set of document clusters corresponds to a discrete time period.

3. The method of claim 1, wherein the documents comprise news articles.

4. The method of claim 1, wherein the identifying instances of each of a set of candidate named entities in the document clusters comprises comparing the text documents with a candidate named entity database to identify instances of the candidate named entities in the text documents.

5. The method of claim 4, wherein the providing for merging the pair of candidate named entities into a common real named entity, based on the computed similarity comprises updating the candidate named entity database for each pair of pair of candidate named entities that meet a threshold similarity score, which is computed based on their computed similarity.

6. The method of claim 1, wherein in the event profile, each index is based on a number of the identified instances of the candidate named entity in a respective one of the clusters.

7. The method of claim 1, wherein the computing of the similarity comprises inputting at least one socio-temporal feature for the pair of the candidate named entities into a classifier trained to output a similarity score, the at least one socio-temporal feature being based on a similarity between the event profiles of the candidate named entities in the pair.

8. The method of claim 7, wherein the at least one socio-temporal feature comprises a first socio-temporal feature which is based on a cosine of the event profiles of the candidate named entities in the pair.

9. The method of claim 7, wherein the at least one socio-temporal feature comprises a second socio-temporal feature which is based on a similarity between the event profiles of the candidate named entities with which the named entities in the pair interact.

10. The method of claim 7, wherein the computing of the similarity further comprises inputting at least one other feature into the classifier.

11. The method of claim 10, wherein the at least one other feature comprises a string similarity feature which is based on a comparison of text strings of the candidate named entities.

12. The method of claim 7, wherein the at least one other feature is based on at least one of an edit distance and a word overlap between the candidate named entities in the pair.

13. The method of claim 7, wherein the providing for merging the candidate named entities into a common real named entity, based on the computed similarity comprises merging a pair of candidate named entities when the classifier score meets a predefined threshold.

14. The method of claim 1, wherein the computing a similarity between a pair of the candidate named entities is further based on a string similarity between the candidate named entities in the pair.

15. The method of claim 1, further comprising outputting an updated named entity database of named entities in which pairs of candidate named entities are merged based on their computed similarity.

16. The method of claim 1, further comprising re-clustering the documents based on the updated named entity database.

17. The method of claim 1, wherein the documents in the clusters are assigned to the clusters by a method which comprises:

assigning each of a set of data points to a respective cluster, each of the data points representing a respective one of the documents;

for a plurality of iterations:
computing a comparison measure between each data point and each of a plurality of the clusters; and
assigning each data point to at least one of the clusters based on the comparison measure and a threshold of the comparison measure; and outputting an assignment of the documents to the clusters, based on the clustering of the data points in one of the iterations.

18. The method of claim 1, wherein the candidate named entities of the merged pair are surface forms or aliases of the real named entity.

19. A computer program product comprising a non-transitory computer-readable medium storing instructions, which when executed by a computer, perform the method of claim 1.

20. A system comprising memory which stores instructions for performing the method of claim 1 and a processor in communication with the memory for executing the instructions.

21. A system for coreference resolution comprising:

memory which stores a set of document clusters, each cluster in the set comprising a set of text documents;

an entity extractor which is configured for identifying instances of each of a set of candidate named entities in the document clusters, the instances of a respective candidate named entity being text elements;

a socio-temporal features extractor which is configured for computing at least one socio-temporal feature for each of a set of pairs of the candidate named entities, based on event profiles for the candidate named entities in each pair, the event profiles each comprising an optionally normalized vector of size k, where k is the number of document clusters in the set, in which each index of the vector is based on the occurrences of the identified instances of the candidate named entity in a respective one of the k clusters;

a prediction component which is configured for outputting a similarity score for each pair of the candidate named entities based on the at least one socio-temporal feature;

a merging component which is configured for merging the candidate named entities of each pair into a common real named entity, when the computed similarity score meets a predetermined threshold; and a processor which implements at least one of the socio-temporal features extractor and the prediction component.

22. The system of claim 21, wherein the prediction component is configured for inputting the at least one socio-temporal feature to a classifier which has been trained to output a similarity score for a pair of candidate named entities based on the socio-temporal feature.

23. The system of claim 21, further comprising a second features extractor which extracts at least one string similarity feature which is based on a comparison of text strings of the candidate named entities in one of the pairs, the similarity score for each pair of the candidate named entities being further based on the at least one string similarity feature.

24. The system of claim 21, further comprising an update component which updates a named entity database, based on the merged pairs.

25. A method for coreference resolution comprising:
receiving a set of document clusters, each cluster in the set comprising a set of text documents;
identifying instances of each of a set of candidate named entities in the document clusters, the instances being text elements;
for each of a plurality of pairs of the candidate named entities in the set of candidate named entities, computing at least one socio-temporal feature which is based on a similarity between event profiles of the candidate named entities in the pair, each event profile comprising a vector where each index of the vector is an optionally normalized number of the identified instances of the candidate name entity in a respective one of the clusters in the set of document clusters;
for each of the pairs of the candidate named entities, inputting the at least one socio-temporal feature to a classifier which has been trained to output a similarity score for a pair of candidate named entities based on the at least one socio-temporal feature; and
merging the candidate named entities of a pair into a common real named entity, when the output similarity score meets a predefined threshold.

* * * * *